US011458723B2

(12) United States Patent
Yudovin-Farber et al.

(10) Patent No.: US 11,458,723 B2
(45) Date of Patent: Oct. 4, 2022

(54) SUPPORT MATERIAL FORMULATION AND ADDITIVE MANUFACTURING PROCESSES EMPLOYING SAME

(71) Applicant: Stratasys Ltd., Rehovot (IL)

(72) Inventors: Ira Yudovin-Farber, Rehovot (IL); Avraham Levy, Petach-Tikva (IL); Mariana Pokrass, Rehovot (IL)

(73) Assignee: Stratasys Ltd., Rehovot (IL)

( * ) Notice: Subject to any disclaimer, the term of this patent is extended or adjusted under 35 U.S.C. 154(b) by 229 days.

(21) Appl. No.: 16/988,781

(22) Filed: Aug. 10, 2020

(65) Prior Publication Data

US 2020/0369020 A1 Nov. 26, 2020

Related U.S. Application Data

(63) Continuation of application No. 15/557,137, filed as application No. PCT/IL2016/050264 on Mar. 10, 2016, now Pat. No. 10,773,512.

(60) Provisional application No. 62/131,338, filed on Mar. 11, 2015.

(51) Int. Cl.
| | |
|---|---|
| *B33Y 70/00* | (2020.01) |
| *B29C 64/40* | (2017.01) |
| *B33Y 10/00* | (2015.01) |
| *C09D 183/12* | (2006.01) |
| *C08L 83/12* | (2006.01) |
| *C08G 77/46* | (2006.01) |
| *B29K 33/04* | (2006.01) |
| *C09D 11/101* | (2014.01) |

(52) U.S. Cl.
CPC .............. *B33Y 70/00* (2014.12); *B29C 64/40* (2017.08); *B33Y 10/00* (2014.12); *C08L 83/12* (2013.01); *C09D 183/12* (2013.01); *B29K 2033/04* (2013.01); *C08G 77/46* (2013.01); *C09D 11/101* (2013.01)

(58) Field of Classification Search
CPC ................................ B29C 64/40; B33Y 70/00
See application file for complete search history.

(56) References Cited

U.S. PATENT DOCUMENTS

| | | | |
|---|---|---|---|
| 6,120,902 A | 9/2000 | Van Havenbergh et al. | |
| 6,136,497 A | 10/2000 | Melisaris et al. | |
| 6,228,923 B1 | 5/2001 | Lombardi et al. | |
| 6,569,373 B2 | 5/2003 | Napadensky | |
| 7,183,335 B2 | 2/2007 | Napadensky | |
| 7,255,825 B2 | 8/2007 | Nielsen et al. | |
| 7,479,510 B2 | 1/2009 | Napadensky et al. | |
| 2003/0107158 A1 | 6/2003 | Levy | |
| 2007/0141007 A1 | 6/2007 | Glynn, Jr. et al. | |
| 2008/0103226 A1 | 5/2008 | Xu | |
| 2012/0098419 A1 | 4/2012 | Chiba et al. | |
| 2013/0073068 A1 | 3/2013 | Napadensky | |
| 2013/0234370 A1 | 9/2013 | Suzuki et al. | |
| 2014/0087613 A1 | 3/2014 | Spyrou et al. | |
| 2018/0079923 A1* | 3/2018 | Umebayashi | B33Y 30/00 |
| 2018/0291219 A1 | 10/2018 | Kiyosada | |
| 2019/0077978 A1 | 3/2019 | Suzuki et al. | |
| 2019/0119514 A1 | 4/2019 | Yudovin-Farber et al. | |

FOREIGN PATENT DOCUMENTS

| | | |
|---|---|---|
| CN | 1926470 | 3/2007 |
| CN | 101178539 | 5/2008 |
| CN | 103189187 | 7/2013 |
| CN | 103772877 | 5/2014 |
| JP | 2000-026730 | 1/2000 |
| JP | 2009-521438 | 6/2009 |
| JP | 2011-094048 | 5/2011 |
| JP | 2013-071262 | 4/2013 |
| JP | 2014-210871 | 11/2014 |
| JP | 2015-031031 | 2/2015 |
| JP | 2015-515514 | 5/2015 |
| WO | WO 2013/128452 | 9/2013 |
| WO | WO 2013/142061 | 9/2013 |
| WO | WO 2014/121242 | 8/2014 |
| WO | WO 2016/121587 | 8/2016 |
| WO | WO 2016/142947 | 9/2016 |

OTHER PUBLICATIONS

Ground(s) of Reason of Rejection dated Jul. 29, 2021 From the Korean Intellectual Property Office Re. Application No. 2017-7028531. ( 6 Pages).
Translation Dated Aug. 12, 2021 of Ground(s) of Reason of Rejection dated Jul. 29, 2021 From the Korean Intellectual Property Office Re. Application No. 2017-7028531. (6 Pages).
Notice of Reasons for Rejection dated Jan. 5, 2021 0 From the Japan Patent Office Re. Application No. 2017-545724 and Its English Summary. (3 Pages).
Notice of Reasons for Rejection dated Sep. 23, 2020 From the Japan Patent Office Re. Application No. 2017-545724 and Its Translation Into English. (6 Pages).
Communication Pursuant to Article 94(3) dated Jan. 20, 2020 From the European Patent Office Re. Application No. 16761209.2.(3 Pages).
International Preliminary Report on Patentability dated Sep. 21, 2017 From the International Bureau of WIPO Re. Application No. PCT/IL2016/050264. (7 Pages).
International Search Report and the Written Opinion dated Dec. 8, 2016 From the International Searching Authority Re. Application No. PCT/IL2016/050264. (15 Pages).
Invitation Pursuant to Rule 63(1) EPC dated Sep. 25, 2018 From the European Patent Office Re. Application No. 16761209.2.(3 Pages).
Invitation to Pay Additional Fees dated Sep. 8, 2016 From the International Searching Authority Re. Application No. PCT/IL2016/050264.

(Continued)

*Primary Examiner* — Marc S Zimmer

(57) ABSTRACT

Novel support material formulations, characterized as providing a cured support material which is readily removable by contacting with water, are disclosed. The formulations comprise a curable water-soluble mono-functional monomer, a water-miscible polymer and a silicone polyether. Methods of fabricating a three-dimensional object, and a three-dimensional object fabricated thereby are also disclosed.

17 Claims, No Drawings

(56) References Cited

OTHER PUBLICATIONS

Notice of Allowance dated Apr. 30, 2020 from the US Patent and Trademark Office Re. U.S. Appl. No. 15/557,137. (13 pages).
Notice of Reasons for Rejection dated Feb. 21, 2020 From the Japan Patent Office Re. Application No. 2017-545724 and Its Translation Into English. (6 Pages).
Notification of Office Action and Search Report dated Jun. 3, 2020 From the State Intellectual Property Office of the People's Republic of China Re. Application No. 201680024369.3. (8 Pages).
Office Action dated Jun. 11, 2020 From the Israel Patent Office Re. Application No. 254401and Its Translation Into English. (6 Pages).
Official Action dated Dec. 27, 2019 From the US Patent and Trademark Office Re. U.S. Appl. No. 15/557,137. (14 pages).
Restriction Official Action dated Sep. 3, 2019 From the US Patent and Trademark Office Re. U.S. Appl. No. 15/557,137. (5 pages).
Supplementary European Search Report and the European Search Opinion dated Dec. 21, 2018 From the European Patent Office Re. Application No. 16761209.2. (6 Pages).
Translation Dated Jun. 19, 2020 of Notification of Office Action dated Jun. 3, 2020 From the State Intellectual Property Office of the People's Republic of China Re. Application No. 201680024369.3. (3 Pages).
Notification of Office Action dated Feb. 22, 2021 From the State Intellectual Property Office of the People's Republic of China Re. Application No. 201680024369.3 and Its Translation Into English. (5 Pages).

\* cited by examiner

SUPPORT MATERIAL FORMULATION AND ADDITIVE MANUFACTURING PROCESSES EMPLOYING SAME

RELATED APPLICATIONS

This application is a continuation of U.S. patent application Ser. No. 15/557,137 filed on Sep. 11, 2017, which is a National Phase of PCT Patent Application No. PCT/IL2016/050264 having International Filing Date of Mar. 10, 2016, which claims the benefit of priority under 35 USC § 119(e) of U.S. Provisional Patent Application No. 62/131,338 filed on Mar. 11, 2015. The contents of the above applications are all incorporated by reference as if fully set forth herein in their entirety.

FIELD AND BACKGROUND OF THE INVENTION

The present invention, in some embodiments thereof, relates to additive manufacturing (AM), and more particularly, but not exclusively, to formulations useful for forming a support material in additive manufacturing such as three-dimensional inkjet printing, and to methods of additive manufacturing utilizing same.

Additive manufacturing (AM) is a technology enabling fabrication of arbitrarily shaped structures directly from computer data via additive formation steps (additive manufacturing; AM). The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional printing such as 3D inkjet printing, electron beam melting, stereolithography, selective laser sintering, laminated object manufacturing, fused deposition modeling and others.

Three-dimensional (3D) printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified using a suitable device.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, and 7,500,846 and U.S. Patent Application having Publication No. 20130073068, all by the same Assignee.

During the additive manufacturing (AM) process, the building material may include "model material" (also known as "object material" or "modeling material"), which is deposited to produce the desired object, and frequently, another material ("support material" or "supporting material") is used to provide temporary support to the object as it is being built. The other material is referred to herein and in the art as "support material" or "supporting material", and is used to support specific areas of the object during building and for assuring adequate vertical placement of subsequent object layers. For example, in cases where objects include overhanging features or shapes, e.g. curved geometries, negative angles, voids, and the like, objects are typically constructed using adjacent support constructions, which are used during the printing and then subsequently removed in order to reveal the final shape of the fabricated object.

The modeling material and the supporting material may be initially liquid and subsequently hardened to form the required layer shape. The hardening process may be performed by a variety of methods, such as UV curing, phase change, crystallization, drying, etc. In all cases, the support material is deposited in proximity of the modeling material, enabling the formation of complex object geometries and filling of object voids. In such cases, the removal of the hardened support material is liable to be difficult and time consuming, and may damage the formed object.

When using currently available commercial print heads, such as ink-jet printing heads, the support material should have a relatively low viscosity (about 10-20 cPs) at the working, i.e., jetting, temperature, such that it can be jetted. Further, the support material should harden rapidly in order to allow building of subsequent layers. Additionally, the hardened support material should have sufficient mechanical strength for holding the model material in place, and low distortion for avoiding geometrical defects.

Examples of materials that can be used as supporting materials are phase change materials, with wax being a non-limiting example. At an appropriately high temperature these materials melt and thus permit support removal when in the liquid state. One of the drawbacks of such phase change is that the temperature required for melting the supporting material may also cause deformation of the model, and hence of the object structure.

Known methods for removal of support materials include mechanical impact (applied by a tool or water-jet), as well as chemical methods, such as dissolution in a solvent, with or without heating. The mechanical methods, however, are labor intensive and are unsuited for small intricate parts.

For dissolving the support materials, the fabricated object is often immersed in water or in a solvent that is capable of dissolving the support materials. In many cases, however, the support removal process may involve hazardous materials, manual labor and/or special equipment requiring trained personnel, protective clothing and expensive waste disposal. In addition, the dissolution process is usually limited by diffusion kinetics and may require very long periods of time, especially when the support constructions are large and bulky. Furthermore, post-processing may be necessary to remove traces of a 'mix layer' on object surfaces. The term "mix layer" refers to a residual layer of mixed hardened model and support materials formed at the interface between the two materials on the surfaces of the object being fabricated, by model and support materials mixing into each other at the interface between them.

Additionally, methods requiring high temperatures during support removal may be problematic since there are model materials that are temperature-sensitive, such as waxes and certain flexible materials. Both mechanical and dissolution methods for removal of support materials are especially problematic for use in an office environment, where ease-of-use, cleanliness and environmental safety are major considerations.

Water-soluble materials for 3D building have been previously described. For example, U.S. Pat. No. 6,228,923 describes a water soluble thermoplastic polymer—Poly(2-ethyl-2-oxazoline)—for use as a support material in a 3D building process involving high pressure and high temperature extrusion of ribbons of selected materials onto a plate.

A water-containing support material comprising a fusible crystal hydrate is described in U.S. Pat. No. 7,255,825. Fusible crystal hydrates undergo a phase change from solid to liquid (i.e. melt) usually at higher than ambient temperature (typically between 20° C. and 120° C. depending upon the substance). Typically, upon melting, fusible crystal hydrates turn into aqueous solutions of the salts from which they are formed. The water content in these solutions is typically high enough to make the solutions suitable for jetting from a thermal ink-jet printhead. The melting process is reversible and material dispensed in a liquid state readily solidifies upon cooling.

Water-soluble compositions suitable for support in building a 3D object are described, for example, in U.S. Pat. Nos. 7,479,510, 7,183,335 and 6,569,373, all to the present Assignee. Generally, the compositions disclosed in these patents comprise at least one UV curable (reactive) component, e.g., an acrylic component, at least one non-UV curable component, e.g. a polyol or glycol component, and a photoinitiator. After irradiation, these compositions provide a semi-solid or gel-like material capable of dissolving or swelling upon exposure to water, to an alkaline or acidic solution or to a water detergent solution.

Besides swelling, another characteristic of such a support material may be the ability to break down during exposure to water, to an alkaline or acidic solution or to a water detergent solution because the support material is made of hydrophilic components. During the swelling process, internal forces cause fractures and breakdown of the cured support. In addition, the support material can contain a substance that liberates bubbles upon exposure to water, e.g. sodium bicarbonate, which transforms into $CO_2$ when in contact with an acidic solution. The bubbles aid in the process of removal of support from the model.

SUMMARY OF THE INVENTION

There is an unmet need for improved support materials in 3D inkjet printing.

The present inventors have now designed and successfully practiced novel water-soluble support material formulations, which supersede currently known support material formulations. The hardened (e.g., cured) support material obtained upon dispensing and curing these formulations can easily and efficiently be removed by dissolution in water or an aqueous solution, without excessive use of harsh chemical reagents, and/or without adversely affecting mechanical properties of the object.

The support material formulations described herein include a curable mono-functional monomer, a non-curable water-miscible polymer and a silicon polyether substance, and optionally also surface active agents, initiators, inhibitors, and the like.

According to an aspect of some embodiments of the present invention there is provided a support material formulation comprising a curable, water-soluble mono-functional monomeric material; a non-curable water-miscible polymeric material; and a silicone polyether.

According to some of any of the embodiments of the present invention, the water-miscible polymeric material comprises a polyol.

According to some of any of the embodiments of the present invention, the polyol is selected from the group consisting of Polyol 3165, polypropylene glycol, and polyglycerol.

According to some of any of the embodiments of the present invention, the silicone polyether is represented by Formula I:

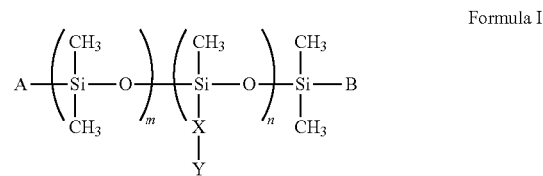

Formula I wherein:

n and m are each independently an integer, wherein n+m is an integer of from 1 to 500, representing the number of backbone units, minus 1;

X is an alkylene or absent;

Y is a polyether moiety or absent; and

A and B are each independently an alkyl or a polyether moiety, provided that either Y or each of A and B is the polyether moiety.

According to some of any of the embodiments of the present invention, the polyether moiety is represented by Formula II:

Formula II wherein:

y is an integer of from 4 to 100;

x is an integer of from 2 to 6;

R' and R" are each independently hydrogen, alkyl, cycloalkyl, halo, and the like; and Z is a non-ionizable moiety.

According to some of any of the embodiments of the present invention, Z is selected from hydrogen, alkyl, and a C(8-16)acyl.

According to some of any of the embodiments of the present invention, the silicon polyether is water-miscible.

According to some of any of the embodiments of the present invention, the mono-functional monomeric material (mono-functional monomer) is a UV-curable monomer.

According to some of any of the embodiments of the present invention, the mono-functional monomeric material (mono-functional monomer) is selected from the group consisting of an acrylate, a methacrylate, an acrylamide, a methacrylamide and a substituted vinyl monomer.

According to some of any of the embodiments of the present invention, the polyol is selected from the group consisting of Polyol 3165, polypropylene glycol, and polyglycerol; the mono-functional monomeric material is selected from the group consisting of an acrylate, a methacrylate, an acrylamide, a methacrylamide and a substituted vinyl monomer; and the silicone polyether is represented by Formula I, as described herein in any of the respective embodiments.

According to some of any of the embodiments of the present invention, a concentration of the mono-functional monomeric material (mono-functional monomer) ranges from 20 to 40 weight percents of the total weight of the formulation.

According to some of any of the embodiments of the present invention, a concentration of the water-miscible polymeric material ranges from 40 to 70 weight percents of the total weight of the formulation.

According to some of any of the embodiments of the present invention, a concentration of the silicone polyether ranges from 5 to 20 weight percents of the total weight of the formulation.

According to some of any of the embodiments of the present invention, the formulation further comprises an initiator.

According to some of any of the embodiments of the present invention, the formulation further comprises an additional agent, such as, but not limited to, a surface active agent and/or an inhibitor.

According to an aspect of some embodiments of the present invention there is provided a method of fabricating a three-dimensional object, the method comprising dispensing a building material so as to sequentially form a plurality of layers in a configured pattern corresponding to the shape of the object, wherein the building material comprises a modeling material formulation and a support material formulation, and wherein the support material formulation comprises the formulation as described herein in any of the embodiments thereof and any combination of these embodiments.

According to some of any of the embodiments of the present invention, the method further comprises, subsequent to the dispensing, exposing the building material to curing energy, to thereby obtain a cured modeling material and a cured support material.

According to some of any of the embodiments of the present invention, the method further comprises removing the cured support material, to thereby obtain the three-dimensional object.

According to some of any of the embodiments of the present invention, the removing comprises contacting the cured support material with water.

According to some of any of the embodiments of the present invention, the removing consists of contacting the cured support material with water.

According to an aspect of some embodiments of the present invention there is provided a three-dimensional object fabricated by the method as described herein in any one of the embodiments thereof and any combination thereof.

According to some of any of the embodiments of the present invention, the object features characteristics as described herein.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

DESCRIPTION OF SPECIFIC EMBODIMENTS OF THE INVENTION

The present invention, in some embodiments thereof, relates to additive manufacturing (AM), and more particularly, but not exclusively, to formulations useful for forming a support material in additive manufacturing such as three-dimensional inkjet printing, and to methods of additive manufacturing utilizing same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

A support material formulation for use in 3D inkjet printing should exhibit the following characteristics before curing: be liquid at room temperature; be dispensable by inkjet nozzles (e.g., exhibit a suitable viscosity at the working temperature); and have a UV reactivity suitable for 3D printing.

After curing, the hardened (e.g., cured) support material should preferably be characterized as being solid or semi-solid; and as being substantially water-soluble. Preferably, the hardened support material should be readily removed by simple, automatable procedures, without applying high temperature and/or harsh chemicals, so as to avoid potential adverse effects to the final object.

Currently available water-soluble support materials for 3D inkjet printing often fail to exhibit the required performance due to, for example, material properties which do not meet the process and/or apparatus requirements, such as suitability for jetting via ink-jet nozzles, and/or mechanical strength sufficient to support the model being formed; and, importantly, for not being easily removable from the fabricated object to provide a final object.

The present inventors have sought for support material formulations which would exhibit improved performance, particularly with regard to removal of the support material from the model material.

More specifically, the present inventors have recognized that in order to efficiently remove hardened support materials made of commonly used formulations, such as UV-curable formulations, a prolonged preliminary dissolution in water (up to 17 hours) should be performed, followed by a prolonged treatment time in NaOH solution (3-8 hours), which by itself is insufficient in case of thick model-support mix layer (as defined herein), and is often followed by immersion in glycerol aqueous solution.

As discussed hereinabove, due to the aggressive processes involved in removal of the support material, the mechanical properties of the model material may be adversely affected, and further, upon drying, residual glycerol is often present on the model material in case immersion in glycerol is required.

The present inventors have now designed and successfully prepared and practiced novel support material formulations, which can easily and efficiently be removed by dissolution in water or an aqueous solution, without the need to use high temperatures and/or harsh chemicals. The present inventors have shown that these novel formulations are usable for forming a water-soluble hardened support material in 3D inkjet printing methods, and exhibit improved performance compared to currently known and/or available formulations for forming water-soluble hardened support materials.

Herein throughout, the phrase "uncured building material" collectively describes the materials that are dispensed during the fabrication process so as to sequentially form the layers, as described herein. This phrase encompasses uncured materials dispensed so as to form the object, namely, one or more uncured modeling material formulation (s), and uncured materials dispensed so as to form the support, namely uncured support material formulations.

Herein throughout, the term "object" describes a final product of the manufacturing process. This term refers to the product obtained by a method as described herein, after removal of the support material. The "object" therefore essentially consists of a cured modeling material, unless otherwise indicated.

The term "object" as used herein throughout refers to a whole object or a part thereof.

Herein throughout, the phrase "cured modeling material" or "hardened modeling material" describes the part of the building material that forms the object, as defined herein, upon exposing the dispensed building material to curing, and following removal of the cured support material. The cured modeling material can be a single cured material or a mixture of two or more cured materials, depending on the modeling material formulations used in the method, as described herein.

Herein throughout, the phrase "modeling material formulation", which is also referred to herein interchangeably as "modeling formulation", "model formulation" or simply as "formulation", describes a part of the uncured building material which is dispensed so as to form the object, as described herein. The modeling formulation is an uncured modeling formulation, which, upon exposure to curing energy, forms the object or a part thereof.

An uncured building material can comprise one or more modeling formulations, and can be dispensed such that different parts of the object are made upon curing from different modeling formulations, and hence are made of different cured modeling materials or different mixtures of cured modeling materials.

Herein throughout, the phrase "hardened support material" is also referred to herein interchangeably as "cured support material" or simply as "support material" or "support" and describes the part of the building material that is intended to support the fabricated object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation, which, upon exposure to curing energy, forms the hardened support material.

Herein throughout, the term "water-miscible" describes a material which is at least partially dissolvable or dispersible in water, that is, at least 50% of the molecules move into the water upon contacting (e.g., mixing) the material and water (e.g., contacting equal volumes or weights of the material and water).

Herein throughout, the term "water-soluble" describes a material that when mixed with water in equal volumes or weights, a homogeneous solution is formed.

Herein throughout, the term "water-dispersible" describes a material that forms a homogeneous dispersion when mixed with water in equal volumes or weights.

Herein throughout, the phrase "dissolution rate" describes a rate at which an object is dissolved in a liquid medium. Dissolution rate can be determined, in the context of the present embodiments, by measuring the time required for an object of a specific volume to completely dissolve in 1 liter or 500 ml of water, at room temperature, under continuous magnetic stirring. The measured time is referred to herein as "dissolution time".

Herein throughout, whenever the phrase "weight percents" is indicated in the context of embodiments of a support material formulation, it is meant weight percents of the total weight of the uncured support material formulation as described herein.

Herein throughout, some embodiments of the present invention are described in the context of the additive manufacturing being a 3D inkjet printing. However, other additive manufacturing processes, such as, but not limited to, SLA and DLP, are contemplated.

The Support Material Formulation:

According to an aspect of some embodiments of the present invention there is provided a support material formulation, which comprises a curable, water-soluble monofunctional material; a non-curable water-miscible polymeric material; and a silicone polyether.

Herein throughout, a "curable material" is a compound (monomeric or oligomeric compound) which, when exposed to curing energy, as described herein, solidifies or hardens to form a cured modeling material as defined herein. Curable materials are typically polymerizable materials, which undergo polymerization and/or cross-linking when exposed to suitable energy source.

A "curable material" is also referred to herein and in the art as "reactive" material.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV-vis radiation, as described herein.

In some embodiments, a curable material as described herein is a polymerizable material that polymerizes via photo-induced radical polymerization.

In some of any of the embodiments described herein, a curable material can be a monomer, an oligomer or a short-chain polymer, each being polymerizable as described herein.

In some of any of the embodiments described herein, when a curable material is exposed to curing energy (e.g., radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to curing energy at which the polymerization reaction occurs. Such curable materials are also referred to herein as "monomeric curable materials", or as "curable monomers".

A curable material, e.g., a curable monomeric material (a curable monomer), can be a mono-functional curable material or a multi-functional curable material.

In some of any of the embodiments described herein, the curable material is a monomeric curable material and in some embodiments, it is a mono-functional curable monomeric material (also referred to herein as "curable mono-functional monomer").

Herein, a mono-functional curable material comprises one functional group that can undergo polymerization when exposed to curing energy (e.g., radiation).

Herein, a multi-functional curable material comprises two or more functional groups that can undergo polymerization when exposed to curing energy (e.g., radiation).

In some of any of the embodiments described herein, the curable monomeric material is water-soluble or at least water-miscible, as defined herein.

In some of any of the embodiments described herein, the curable mono-functional monomer comprises one or more hydrophilic substituents, which render it water soluble.

As used herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic group is one that is typically charge-polarized and capable of hydrogen bonding.

Hydrophilic groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic group is 10:1 or lower, and can be, for example, 8:1, more preferably 7:1, 6:1, 5:1 or 4:1, or lower.

Hydrophilic groups are typically polar groups, comprising one or more electron-donating heteroatoms such as oxygen and nitrogen. Exemplary hydrophilic groups include, but are not limited to, an electron-donating heteroatom, a carboxylate, a thiocarboxylate, oxo (=O), a linear amide, hydroxy, a (C1-4)alkoxy, an (C1-4)alcohol, a heteroalicyclic (e.g., having a ratio of carbon atoms or heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), a phosphate, a phosphonate, a sulfate, a sulfonate, sulfonamide, as these groups are defined herein, and any combinations thereof (e.g., a hydrophilic group that comprises two or more of the indicated hydrophilic groups).

A curable, water-soluble mono-functional material according to some embodiments of the present invention can be a vinyl-containing compound represented by Formula I:

Formula I

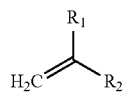

wherein at least one of $R_1$ and $R_2$ is and/or comprises a hydrophilic group, as defined herein.

The (=CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is water-soluble.

In some embodiments, $R_1$ is a carboxylate group, —C(=O)—OR', and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofuran, oxalidine, and the likes), hydroxyl, C(1-4)alkyl optionally substituted or interrupted by one or more hydrophilic groups (e.g., hydroxy, —O—, amine or —NH—), hydroxy, thiol, alkylene glycol, or a hydrophilic polymeric or oligomeric moiety, as described herein. An exemplary water soluble, mono-functional acrylate monomer is acryloyl morpholine (ACMO). Another exemplary such monomer is [2-(acryloyloxy)ethyl]trimethylammonium chloride. Other water soluble acrylate or methacrylate mono-functional monomers are contemplated.

In some embodiments, $R_1$ is amide (—C(=O)—NR'R"), and the compound is a mono-functional acrylamide monomer. In some of these embodiments, $R_2$ is methyl, and the compound is mono-functional methacrylamide monomer. In some of these embodiments, the amide is substituted. For example, one or both of R' and R" in the amide group —C(=O)—NR'R" is or comprises a hydrophilic group, as described herein for R'. Exemplary such monomers include N-(3,3-dimethylaminopropyl) methacrylamide, and methacrylamide (2-methyl-propenamide). Other water soluble acrylamide or methacrylamide mono-functional monomers are contemplated.

In some embodiments, one or both of $R_1$ and $R_2$ is/are a hydrophilic group other than a carboxylate or an amide, as defined herein, for example, is a cyclic amide (lactam), a cyclic ester (lactone), a phosphate, phosphonate, sulfate, sulfonate, alkoxy, substituted alkoxy, or else, as long as the monomer is water-soluble. In such embodiments, the monomer is a substituted vinyl monomer. Exemplary such vinyl monomers are vinyl phosphonic acid and hydroxybutyl vinyl ether. Other water soluble mono-functional vinyl ethers or otherwise substituted vinyl monomers are contemplated.

In some of any of the embodiments described herein, the water-miscible polymeric materials can be any of the water-miscible polymeric materials commonly used in support material formulations.

In some of any of the embodiments described herein, the water-miscible polymeric material is non-curable (also referred to herein as "non-reactive"). The term "non-curable" encompasses polymeric materials that are non-polymerizable under any conditions, as well as polymeric materials that are non-curable under conditions at which the mono-functional monomer as described herein is curable, or under any condition used in a fabrication of the object. Such polymeric materials are typically devoid of a polymerizable group or of a UV-photopolymerizable group.

In some embodiments, the polymeric material is non-reactive towards the curable monomer as described herein, that is, it does not react with the monomer and is incapable of interfering with the curing of the monomer, under the fabrication conditions, including the curing conditions.

In some of any of the embodiments described herein the polymeric material is water soluble or water dispersible or water miscible polymeric material, as defined herein.

In some embodiments, the polymeric material comprises a plurality of hydrophilic groups as defined herein, either within the backbone chain of the polymer or as pendant groups. Exemplary such polymeric materials are polyols. Some representative examples include, but are not limited to, Polyol 3165, polypropylene glycol, polyethylene glycol, poly glycerol, ethoxylated forms of these polymers, paraffin oil and the like, and any combination thereof.

In some of any of the embodiments described herein, the support material formulation further comprises a water-miscible, non-curable, non-polymeric material, such as, for example, propane diol.

In some of any of the embodiments described herein, the support material formulation as described herein comprises a silicone polyether.

Silicone polyethers are polymeric materials that typically comprise a silicone backbone and two or more polyether terminal and/or pendant groups. The ratio of the silicone to polyether, and the molecular weight and composition of the components determine the solubility and specific properties of a silicone polyether. When the polyether groups are pendant groups, the silicone polyether is referred to as multi-pendant and when the polyether groups are terminal groups (attached to the terminal silicone backbone units of the silicone backbone), the silicone polyether is referred to as linear di-functional polymer, or simply as linear silicone polyether.

In some of any of the embodiments described herein, the silicone backbone of a silicone polyether is of polydimethyl siloxane (PDMS, Dimethicone).

Silicone polyethers as described herein can be collectively represented by Formula I:

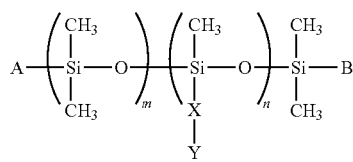

Formula I wherein:

n and m each independently an integer, such that n+m is an integer of from 1 to 500, representing the number of backbone units in the silicone backbone chain, minus 1 (the terminal unit which comprises B);

X is an alkylene, as defined herein or absent;

Y is a polyether moiety, as defined herein, or absent; and

A and B are each independently an alkyl or a polyether moiety, as defined herein.

In some embodiments, A and B are each a polyether moiety, and X and Y are absent, such that the silicone polyether is a linear polymer.

In some embodiments, Y is a polyether moiety, optionally linked to the backbone units via an alkylene (X), and the silicone polyether is multi-pendant polymer. In some of these embodiments, A and B are each independently an alkyl, for example, methyl. Alternatively, one or both of A and B is/are a polyether moiety, as defined herein.

It is noted that while the backbone units presented in Formula I are of PDMS, the methyl substituents of some or all of the silicone backbone units can be replaced by other substituents, for example, by an alkyl other than methyl.

In some of any of the embodiments described herein, when A and B and/or Y is a polyether moiety, this moiety can be the same or different. The polyether moieties can be collectively represented by Formula II:

—O—[(CR'R")$_x$-O]$_y$-Z        Formula II wherein:

y is an integer of from 4 to 100, representing the number of repeating alkylene glycol groups in the polyether moiety;

x is an integer of from 2 to 6, representing the number of carbon atom in each alkylene group;

R' and R" are each independently hydrogen, alkyl, cycloalkyl, halo, aldehyde, carbonyl, carboxylate, amine, and the like, or, alternatively, R' and R" can form together an oxo group, or a carbocyclic (aryl or cycloalkyl) or heterocyclic (heteroalicyclic or heteroaryl) group, representing optional substituents of some or all of the carbon atoms in some or all of the repeating alkylene groups in the polyether moiety; and Z can be hydrogen, alkyl, acyl, aldehyde, amine, and the like, which forms, together with the oxygen of the last alkylene glycol group, a terminal group of the polyether moiety.

A polyether moiety can therefore be composed of repeating alkylene glycol backbone units, wherein the backbone units can be the same or different (namely, 2 or more different types of alkylene glycol groups, which can be in any order in the polymeric moiety). When different, the alkylene glycol groups can differ from one another by the number of carbon atoms x and/or by the nature of R' and/or R".

In some of any of the embodiments described herein, the number of alkylene glycol backbone units, y, ranges from 4 to 50, or from 4 to 30, or from 4 to 20, or from 4 to 10, including any subranges and intermediate values therebetween.

In some of any of the embodiments described herein, the polyether moiety is a polyethylene glycol moiety, such that for all alkylene glycol groups, x is 2.

In some of these embodiments, all the alkylene glycol groups are the same.

In some of these embodiments, all the alkylene glycol groups are the same and are non-substituted, such that R' and R" are each hydrogen.

In some of these embodiments, some or all of the alkylene glycol groups are substituted, for example, one or both carbon atoms in an alkylene group are substituted, as described hereinabove for R' and/or R" being other than hydrogen.

In some embodiments, when the alkylene glycol is substituted, the substituent is a non-ionizable substituent, as defined herein.

In some embodiments, R' and R" are each independently hydrogen or alkyl.

In some embodiments, Z is a non-ionizable group, as described herein.

In exemplary embodiments, Z is hydrogen (forming a hydroxyl terminal group), alkyl (forming an alkoxy terminal group), or a C(8-16)acyl (forming an ester terminal group).

As used herein, the term "non-ionizable" means that a group or a substituent is such that does not form an ion (a cation or an anion) spontaneously (namely, without applying a potential or without subjecting it to chemical conditions which facilitate charge transfer). The term "non-ionizable" means, for example, that the group or substituent does not accept or donate a proton so as to turn into a cation or an anion, respectively, in an aqueous solution of pH 7.

Examples of ionizable groups include, but are not limited to, amine, which forms ammonium cation, carboxylic acid, which forms carboxylate anion, sulfonic acid, which forms sulfonate anion, phosphonic or phosphoric acid, which forms phosphonate or phosphate anions, sulfuric acid, which forms sulfate anion, phosphine, which forms phosphinium cation, sulfone, which forms sulfonium cation, pyridine, which forms pyridinium cation and the like.

Groups such as alkyls, aryls, halo, cycloalkyls, esters, alkoxy, ketones, and the like are typically non-ionizable.

In some embodiments, at least some of all of the polyether moieties in a silicon polyether as described herein do not include an ionizable substituent or group. That is, when a polyether moiety comprises one or more alkylene glycol group(s) that are substituted, the substituent is non-ionizable, and/or Z forms a non-ionizable terminal group.

In some of any of the embodiments described herein, Z in Formula II forms a terminal hydroxyl (when Z is hydrogen) or ester (when Z is acyl, —C(=O)—R', with R' as defined herein).

When Z is acyl, it can be, for example, a fatty acyl, such that R' is an alkyl being 4 to 16 carbon atoms in length. Alternatively, Z is an acyl which is derived from other organic acids, such as, but not limited to, succinic acid, maleic acid, ascorbic acid and the like.

Alternatively, Z can be or can comprise a positively charged moiety such as an ammonium moiety, e.g., quaternary ammonium.

In some of any of the embodiments described herein, when the silicone ether is multi-pendant, n and m are each independently an integer of from 10 to 400, including any subranges and intermediate values therebetween.

In some of any of the embodiments described herein, when the silicone polyether is multi-pendant, and the n to m ratio ranges from 10:1 to 1:100, or from 1:1 to 1:100, including any subranges and intermediate values therebetween.

In some of any of the embodiments described herein, the silicone polyether is characterized as water-soluble or water-dispersible at a concentration of 10% by weight in water.

Exemplary such silicon polyethers are those marketed under the tradename "Silsurf" by SilTech, and include, for example, Silsurf A009-UP, Silsurf 010-D, Silsurf C208, Silsurf J208, Silsurf D212-CG, Silsurf B608, Silsurf C410, Silsurf E608, Silsurf J1015-O, and Silsurf J1015-O-AC, and equivalent or analogous silicon ethers.

In some of any of the embodiments described herein, the type of the silicone polyether (linear or multi-pendant), the ratio of n to m in case of a multi-pendant polymer, the molecular weight of the silicone polyether, and the type of the polyether moiety, are selected such that (i) the silicone polyether is water miscible or water soluble; (ii) the support material formulation exhibits a desired viscosity at the working (e.g., jetting) temperature, as described herein; and (iii) the cured support material obtained from the formulation exhibits a desired dissolution rate, as described herein.

In some embodiments, the support material formulation is such that when a 20×20×20 mm cube is printed therefrom using a 3D printing system, and is placed in 1 Liter tap water, the cube is completely dissolved within no more than 120 minutes, or no more than 100 minutes, or no more than 90 minutes, or no more than 80 minutes, or no more than 75 minutes or than 70 minutes. Shorter time periods are also contemplated.

Representative, non-limiting examples of silicone polyethers that are usable in the context of the present embodiments include the silicone polyethers marketed as Silsurf C-410 and Silsense SW=12, by Siltech company, the structures of which are depicted in the Examples section that follows.

Exemplary, non-limiting formulations according to some embodiments of the present invention are presented in Tables 1 and 2 in the Examples section that follows.

In some of any of the embodiments described herein, a concentration of the curable, mono-functional monomer, as described herein in any of the respective embodiments, and any combination thereof, ranges from 20 to 40 weight percents of the total weight of the formulation, including any intermediate values and subranges therebetween.

In some of any of the embodiments described herein, a concentration of the water-miscible polymeric material, as described herein in any of the respective embodiments, and any combination thereof, ranges from 40 to 70 weight percents of the total weight of the formulation, including any intermediate values and subranges therebetween.

In some of any of the embodiments described herein, a concentration of the silicone polyether, as described herein in any of the respective embodiments, and any combination thereof, ranges from 5 to 20 weight percents of the total weight of the formulation, including any intermediate values and subranges therebetween.

Exemplary support material formulations according to some embodiments of the present invention comprise the following substances:

One or more curable water-soluble mono-functional monomer(s), as described herein, at a concentration of from 20 to 40 weight percents of the total weight of the formulation, including any intermediate values and subranges therebetween;

One or more non-curable water miscible polymer(s), for example, one or more polyol(s), as described herein, at a concentration of from 40 to 70 weight percents of the total weight of the formulation, including any intermediate values and subranges therebetween; and One or more silicon polyether(s), as described herein, at a concentration of 5 to 20 weight percents of the total weight of the formulation, including any intermediate values and subranges therebetween.

In some of any of the embodiments described herein, and any combination thereof, the support material formulation further comprises an initiator, for inducing a polymerization of the curable material upon exposure to curing energy or curing conditions.

In some of these embodiments, the curable material is a photopolymerizable or UV-curable material and the initiator is a photoinitiator.

The photoinitiator can be a free radical photo-initiator, a cationic photo-initiator, or any combination thereof.

A free radical photoinitiator may be any compound that produces a free radical upon exposure to radiation such as ultraviolet or visible radiation and thereby initiates a free-radical polymerization reaction. Non-limiting examples of suitable free-radical photoinitiators include phenyl ketones, such as alkyl/cycloalkyl phenyl ketones, benzophenones (aromatic ketones) such as benzophenone, methyl benzophenone, Michler's ketone and xanthones; acylphosphine oxide type photo-initiators such as 2,4,6-trimethylbenzoly-diphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, and 1-hydroxycyclohexyl phenyl ketone (e.g., marketed as Igracure® 184).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

Free radical photoinitiators are usable when curable monomers which polymerize via free radical polymerization are included in the formulation. Such monomers include, for example, acrylates, methacrylates, acrylamides and methacrylamides, as described herein. Other curable monomers that undergo free radical polymerization when exposed to light irradiation are contemplated.

Suitable cationic photoinitiators include, for example, compounds which form aprotic acids or Bronstead acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

Cationic photoinitiators are usable when curable monomers which polymerize via cationic polymerization are included in the formulation.

In some of any of the embodiments described herein, the uncured support material formulation may further comprise one or more additional agents that are beneficially used in the fabrication process. Such agents include, for example, surface active agents, inhibitors and stabilizers.

In some embodiments, a support material formulation as described herein comprises a surface active agent. A surface-active agent may be used to reduce the surface tension of the formulation to the value required for jetting or for other printing process, which is typically around 30 dyne/cm. An exemplary such agent is a silicone surface additive such as, but not limited to, a surface agent marketed as BYK-345.

In some embodiments, a support material formulation as described herein further comprises an inhibitor, which inhibits pre-polymerization of the curable material during the fabrication process and before it is subjected to curing conditions. An exemplary stabilizer (inhibitor) is Tris(N-nitroso-N-phenylhydroxylamine) Aluminum Salt (NPAL) (e.g., as marketed under FirstCure® NPAL).

Suitable stabilizers include, for example, thermal stabilizers, which stabilize the formulation at high temperatures.

According to some of any of the embodiments described herein, the support material formulation exhibits a viscosity that is suitable for 3D inkjet printing.

In exemplary embodiments, the viscosity of the support material formulation is lower than 30 cps, or lower than 25 cps, or lower than 20 cps, at the working temperature. In some embodiments, the viscosity of the formulation is higher at room temperature and can be, for example, above 50 cps, or above 80 cps, at room temperature.

In some of any of the embodiments described herein, the support material formulation is such that exhibits a viscosity of from 10 to 20 cps at room temperature. In some embodiments, the curable monomer, the polymeric material and particularly the silicone polyether, and the concentration of each, are selected or manipulated such that the formulation exhibits a desired viscosity as described herein (before curing).

In some of any of the embodiments described herein, the support material formulation is such that provides, upon exposure to curing conditions as described herein, a cured support material that exhibits a dissolution time, as defined herein, of a 20×20×20 mm object, which is lower than 120 minutes, lower than 100 minutes, lower than 90 minutes, lower than 80 minutes and even lower than 75 minutes.

In some embodiments, the curable monomer, the polymeric material and particularly the silicone polyether, and the concentration of each, are selected or manipulated such that the formulation provides a cured support material which exhibits such a dissolution time or a corresponding dissolution rate.

The Method:

According to an aspect of some embodiments of the present invention there is provided a method of fabricating a three-dimensional object, which utilizes a support material formulation as described herein. The method is also referred to herein as a fabrication process. In some embodiments, the method comprises dispensing an uncured building material so as to sequentially form a plurality of layers in a configured pattern corresponding to the shape of the object. In some embodiments, the (uncured) building material comprises a modeling material formulation and a support material formulation as described herein in any of the respective embodiments and any combination thereof.

According to some embodiments of the present invention, the fabrication method is additive manufacturing of a three-dimensional object According to some embodiments of this aspect, formation of each layer is effected by dispensing at least one uncured building material, and exposing the dispensed building material to curing energy or curing conditions, to thereby form a cured building material, which is comprised of a cured modeling material and a cured support material.

According to some of any of the embodiments described herein, the additive manufacturing is preferably by three-dimensional inkjet printing.

The method of the present embodiments manufactures three-dimensional objects in a layerwise manner by forming a plurality of layers in a configured pattern corresponding to the shape of the objects.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material (e.g., a modeling material formulation or a support material formulation) is to be delivered thereto. The decision is made according to a computer image of the surface.

When the AM is by three-dimensional inkjet printing, an uncured building material, as defined herein, is dispensed from a dispensing head having a set of nozzles to deposit building material in layers on a supporting structure. The AM apparatus thus dispenses (uncured) building material in target locations which are to be occupied and leaves other target locations void. The apparatus typically includes a plurality of dispensing heads, each of which can be configured to dispense a different building material. Thus, different target locations can be occupied by different building materials (e.g., a modeling formulation and/or a support formulation, as defined herein).

In some of any of the embodiments of this aspect of the present invention, the method begins by receiving 3D printing data corresponding to the shape of the object. The data can be received, for example, from a host computer which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Next, droplets of the uncured building material as described herein are dispensed in layers, on a receiving medium, using at least two different multi-nozzle inkjet printing heads, according to the printing data. The receiving medium can be a tray of a three-dimensional inkjet system or a previously deposited layer. The uncured building material comprises a support material formulation as described herein for any of the respective embodiments and any combination thereof.

In some embodiments of the present invention, the dispensing is effected under ambient environment.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 30 centipoises, preferably about 25 centipoises and more preferably about 20 centipoises, or 18 centipoises, or 16 centipoises, or 14 centipoises, or 12 centipoises, or 10 centipoises.

The heating can be executed before loading the respective formulation into the printing head of the 3D printing system, or while the formulation is in the printing head or while the composition passes through the nozzle of the printing head.

In some embodiments, the heating is executed before loading of the respective composition into the printing head, so as to avoid clogging of the printing head by the composition in case its viscosity is too high.

In some embodiments, the heating is executed by heating the printing heads, at least while passing the first and/or second composition through the nozzle of the printing head.

Once the uncured building material is dispensed on the receiving medium according to the 3D printing data, the method optionally and preferably continues by exposing the dispensed building material to conditions the effect curing. In some embodiments, the dispensed building material is exposed to curing energy by applying curing energy to the deposited layers. Preferably, the curing is applied to each individual layer following the deposition of the layer and prior to the deposition of the previous layer.

The curing energy or condition can be, for example, a radiation, such as an ultraviolet or visible irradiation, or other electromagnetic radiation, or electron beam radiation, depending on the building material used. The curing energy or condition applied to the dispensed layers serves for curing or solidifying or hardening the modeling material formulation and the support material formulation. Preferably, the same curing energy or condition is applied to effect curing of both the modeling materials and the support material. Alternatively, different curing energies or conditions are applied to the dispensed building material, simultaneously or sequentially, to effect curing of the modeling material formulation and the support material formulation.

According to some of any of the embodiments of this aspect of the present invention, once the building material is dispensed to form an object and curing energy or condition is applied, the cured support material is removed, to thereby obtain the final three-dimensional object.

According to some of any of the embodiments described herein, the support material is removed by contacting the cured support material with water or an aqueous solution. Contacting may be effected by means known in the art, for example, by immersing the object is water, and/or by jetting water onto the object. The contacting can be effected manually or in an automated manner.

In some of any of the embodiments described herein, removal of the support material is effected solely by (consists essentially of) contacting it with water. In some embodiments, the removal of the solid material does not include further contacting the object with e.g., basic/acidic aqueous solution and/or with glycerol, and does not include mechanical removal of the support material.

In some of any of the embodiments described herein, the contacting is effected for a time period that is in correlation with the amount of the support material in the printed object. In some embodiments, the contacting is effected for a time period of no more than 120 minutes, or no more than 100 minutes, or no more than 90 minutes, or no more than 80 minutes, or no more than 75 minutes or no more than 70 minutes or no more than 60 minutes. Shorter time periods are also contemplated.

In some embodiments, the contacting is effected during a time period that is shorter by at least 10%, at least 20%, at least 30%, at least 40%, and even by 50%, or shorter, compared to a time period required to remove a cured support material made of commercially available or otherwise known support formulations.

Any system suitable for AM of an object is usable for executing the method as described herein.

A representative and non-limiting example of a system suitable for AM of an object according to some embodiments of the present invention comprises an additive manufacturing apparatus having a dispensing unit which comprises a plurality of dispensing heads. Each head preferably comprises an array of one or more nozzles, through which a liquid (uncured) building material is dispensed.

Preferably, but not obligatorily, the AM apparatus is a three-dimensional inkjet printing apparatus, in which case the dispensing heads are inkjet printing heads, and the building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, binder jet powder based apparatus, fused deposition modeling apparatus and fused material deposition apparatus.

Each dispensing head is optionally and preferably fed via one or more building material reservoir(s) which may optionally include a temperature control unit (e.g., a temperature sensor and/or a heating device), and a material level sensor. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Optionally, but not obligatorily, the overall number of dispensing nozzles or nozzle arrays is selected such that half of the dispensing nozzles are designated to dispense support material formulations and half of the dispensing nozzles are designated to dispense modeling material formulations, i.e. the number of nozzles jetting modeling materials is the same as the number of nozzles jetting support material. Yet it is to be understood that it is not intended to limit the scope of the present invention and that the number of modeling material depositing heads (modeling heads) and the number of support material depositing heads (support heads) may differ. Generally, the number of modeling heads, the number of support heads and the number of nozzles in each respective head or head array are selected such as to provide a predetermined ratio, a, between the maximal dispensing rate of the support material and the maximal dispensing rate of modeling material. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material formulation is generally the same as the overall dispensing rate of the modeling material formulation(s) when all modeling heads and support heads operate.

In a preferred embodiment, there are M modeling heads each having m arrays of p nozzles, and S support heads each having s arrays of q nozzles such that $M \times m \times p = S \times s \times q$. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

The AM apparatus can further comprise a curing unit which can comprise one or more sources of a curing energy or a curing condition. The curing source can be, for example, a radiation source, such as an ultraviolet or visible or infrared lamp, or other sources of electromagnetic radiation, or electron beam source, depending on the modeling material formulation(s) being used. The curing energy source serves for curing or solidifying the building material formulation(s).

The dispensing head and curing energy source (e.g., radiation source) are preferably mounted in a frame or block which is preferably operative to reciprocally move over a tray, which serves as the working surface (a receiving medium). In some embodiments of the present invention, the curing energy (e.g., radiation) sources are mounted in the block such that they follow in the wake of the dispensing heads to at least partially cure or solidify the materials just dispensed by the dispensing heads. According to the common conventions, the tray is positioned in the X-Y plane, and is preferably configured to move vertically (along the Z direction), typically downward. In various exemplary embodiments of the invention, the AM apparatus further comprises one or more leveling devices, e.g. a roller, which serve to straighten, level and/or establish a thickness of the newly formed layer prior to the formation of the successive layer thereon. The leveling device preferably comprises a waste collection device for collecting the excess material generated during leveling. The waste collection device may comprise any mechanism that delivers the material to a waste tank or waste cartridge.

In use, the dispensing heads as described herein move in a scanning direction, which is referred to herein as the X direction, and selectively dispense building material in a predetermined configuration in the course of their passage over the tray. The building material typically comprises one or more types of support material formulations and one or more types of modeling material formulations. The passage of the dispensing heads is followed by the curing of the modeling and support material formulation(s) by the source of curing energy or condition (e.g., radiation). In the reverse passage of the heads, back to their starting point for the layer just deposited, an additional dispensing of building material may be carried out, according to predetermined configuration. In the forward and/or reverse passages of the dispensing heads, the layer thus formed may be straightened by the leveling device, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternatively, the dispensing heads may move in the Y direction between forward and reverse movements or after more than one forward-reverse movement. The series of scans performed by the dispensing heads to complete a single layer is referred to herein as a single scan cycle.

Once the layer is completed, the tray is lowered in the Z direction to a predetermined Z level, according to the desired thickness of the layer subsequently to be printed. The procedure is repeated to form a three-dimensional object which comprises a modeling material and a support material in a layerwise manner.

In some embodiments, the tray may be displaced in the Z direction between forward and reverse passages of the dispensing head, within the layer. Such Z displacement is carried out in order to cause contact of the leveling device with the surface in one direction and prevent contact in the other direction.

The system for performing the method as described herein optionally and preferably comprises a building material supply apparatus which comprises the building material containers or cartridges and supplies a plurality of building material formulations (modeling material formulation(s) and a support material formulation as described herein to the fabrication apparatus.

The system may further comprise a control unit which controls the fabrication apparatus and optionally and preferably also the supply apparatus as described herein. The control unit preferably communicates with a data processor which transmits digital data pertaining to fabrication instructions based on computer object data, stored on a computer readable medium, preferably a non-transitory medium, in a form of a Standard Tessellation Language (STL) format or any other format such as, but not limited to, the aforementioned formats. Typically, the control unit controls the voltage applied to each dispensing head or nozzle array and the temperature of the building material in the respective printing head.

Once the manufacturing data is loaded to the control unit, it can operate without user intervention. In some embodiments, the control unit receives additional input from the operator, e.g., using a data processor or using a user interface communicating with the control unit. The user interface can be of any type known in the art, such as, but not limited to, a keyboard, a touch screen and the like. For example, the control unit can receive, as additional input, one or more building material types and/or attributes, such as, but not limited to, color, characteristic distortion and/or transition temperature, viscosity, electrical property, magnetic property. Other attributes and groups of attributes are also contemplated.

Further details on the principles and operations of an AM system such as described herein is found in U.S. Patent Application having Publication No. 2013/0073068, the contents of which are hereby incorporated by reference.

According to some embodiments of each of the methods and systems described herein, the uncured building material comprises at least one support material formulation as described herein.

The Object:

According to an aspect of some embodiments of the present invention, there is provided a three-dimensional object prepared by the method as described herein, in any of the embodiments thereof and any combination thereof.

According to an aspect of some embodiments of the present invention there is provided a 3D object, fabricated by an AM method as described herein.

According to some embodiments, the object is characterized by residual amount of a support material which ranges from null to no more than 10 weight percents, or no more than 6 weight percents, or no more than 5 weight percents, of the amount of the support material used in the fabrication process.

According to some embodiments, the object is devoid of a mixed layer, as defined herein.

In some embodiments, the object is characterized as comprising a mixed layer, as defined herein, which is no more than 10 volume percents, or no more than 8 volume percents, or no more than 6 volume percents, or no more than 5 volume percents, or no more than 4 volume percents, or no more than 3 volume percents, or no more than 2 volume percents or no more than 1 volume percent of the total volume of the object.

According to some embodiments, the object is devoid of residual amount of glycerol.

By "devoid of" it is meant less than 0.1% by weight, or less than 0.05, or less than 0.01% by weight, or less, and up to nullified amount.

According to some embodiments, the object exhibits improved mechanical properties compared to objects made while using commercially available support material formulations. Improved mechanical properties include, for example, higher tensile strength, higher elongation at break, lower flexural modulus, higher flexural modulus, higher heat deformation temperature (HDT), and higher notch impact. The improvement in mechanical properties can be, for example, of 10-100%, and even higher. Reference is made in this regard, for example, to Table 4 in the Examples section that follows.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof. Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "alkyl" describes a saturated aliphatic hydrocarbon including straight chain and branched chain groups. Preferably, the alkyl group has 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. More preferably, the alkyl is a medium size alkyl having 1 to 10 carbon atoms. Most preferably, unless otherwise indicated, the alkyl is a lower alkyl having 1 to 4 carbon atoms (C(1-4) alkyl). The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

When an alkyl group connects two or more moieties via at least two carbons in its chain, it is also referred to herein as "alkylene" or "alkylene chain".

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofuran, tetrahydropyrane, morpholino, oxalidine, and the like. The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' group, or an —O—S(=O)$_2$—O— group, where R' is as defined hereinabove.

The term "thiosulfate" describes a —O—S(=S)(=O)—OR' group or a —O—S(=S)(=O)—O— group, where R' is as defined hereinabove.

The term "sulfite" describes an —O—S(=O)—O—R' group or a —O—S(=O)—O— group, where R' is as defined hereinabove.

The term "thiosulfite" describes a —O—S(=S)—O—R' group or an —O—S(=S)—O— group, where R' is as defined hereinabove.

The term "sulfinate" describes a —S(=O)—OR' group or an —S(=O)—O— group, where R' is as defined hereinabove.

The term "sulfoxide" or "sulfinyl" describes a —S(=O)R' group or an —S(=O)— group, where R' is as defined hereinabove.

The term "sulfonate" describes a —S(═O)₂—R' group or an —S(═O)₂— group, where R' is as defined herein.

The term "S-sulfonamide" describes a —S(═O)₂—NR'R" group or a —S(═O)₂—NR'— group, with R' and R" as defined herein.

The term "N-sulfonamide" describes an R'S(═O)₂—NR"— group or a —S(═O)₂—NR'— group, where R' and R" are as defined herein.

The term "sulfone" describes a —S—R'R" group or —SR'— group, where R' and R" are as defined herein.

The term "phosphonate" describes a —P(═O)(OR')(OR") group or a —P(═O)(OR')(O)— group, with R' and R" as defined herein.

The term "thiophosphonate" describes a —P(═S)(OR')(OR") group or a —P(═S)(OR')(O)— group, with R' and R" as defined herein.

The term "phosphinyl" or "phosphine" describes a —PR'R" group or a —PR'— group, with R' and R" as defined hereinabove.

The term "phosphine oxide" describes a —P(═O)(R')(R") group or a —P(═O)(R')— group, with R' and R" as defined herein.

The term "phosphine sulfide" describes a —P(═S)(R')(R") group or a —P(═S)(R')— group, with R' and R" as defined herein.

The term "phosphate" describes an —O—PR'(═O)(OR") group or an —O—PR'(═O)(O)— group, with R' and R" as defined herein.

The term "phosphonate" describes a —PR'(═O)(OR") group or a PR'(═O)(O)— group, with R' and R" as defined herein.

The term "carbonyl" or "carbonate" as used herein, describes a —C(═O)—R' group or a —C(═O)— group, with R' as defined herein.

The term "thiocarbonyl" as used herein, describes a —C(═S)—R' group or a —C(═S)— group, with R' as defined herein.

The term "oxo" as used herein, describes a (═O) group, wherein an oxygen atom is linked by a double bond to the atom (e.g., carbon atom) at the indicated position.

The term "thiooxo" as used herein, describes a (═S) group, wherein a sulfur atom is linked by a double bond to the atom (e.g., carbon atom) at the indicated position.

The term "oxime" describes a ═N—OH group or a ═N—O— group.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "cyanurate" describes a

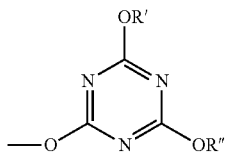

group or

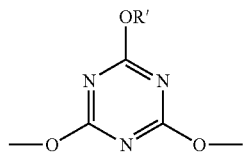

group, with R' and R" as defined herein.

The term "isocyanurate" describes a

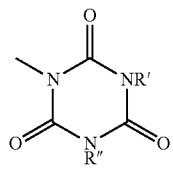

group or a

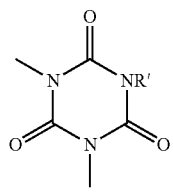

group, with R' and R" as defined herein.

The term "thiocyanurate" describes a

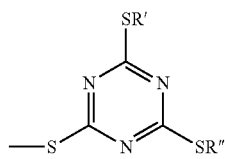

group or

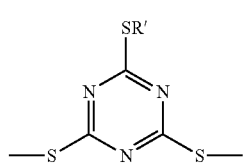

group, with R' and R" as defined herein.

The term "isocyanate" describes an —N═C═O group.

The term "isothiocyanate" describes an —N═C═S group.

The term "nitro" describes an —NO₂ group.

The term "acyl halide" describes a —(C═O)R"" group wherein R"" is halide, as defined hereinabove.

The term "carboxylate" as used herein encompasses C-carboxylate and O-carboxylate.

The term "C-carboxylate" describes a —C(═O)—OR' group or a —C(═O)—O— group, where R' is as defined herein.

The term "O-carboxylate" describes a —OC(=O)R' group or a —OC(=O)— group, where R' is as defined herein. When R' is other than H, this term describes an ester.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' group or a —C(=S)—O— group, where R' is as defined herein.

The term "O-thiocarboxylate" describes a —OC(=S)R' group or a —OC(=S)— group, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— group or a —OC(=O)—NR'— group, with R' and R" as defined herein.

The term "O-carbamate" describes an —OC(=O)—NR'R" group or an —OC(=O)—NR'— group, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" group or a —OC(=S)—NR'— group, with R' and R" as defined herein.

The term "N-thiocarbamate" describes an R"OC(=S)NR'— group or a —OC(=S)NR'— group, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" group or a —SC(=S)NR'— group, with R' and R" as defined herein.

The term "N-dithiocarbamate" describes an R"SC(=S)NR'— group or a —SC(=S)NR'— group, with R' and R" as defined herein.

The term "urea", which is also referred to herein as "ureido", describes a —NR'C(=O)—NR"R'" group or a —NR'C(=O)—NR"— group, where R' and R" are as defined herein and R'" is as defined herein for R' and R".

The term "thiourea", which is also referred to herein as "thioureido", describes a —NR'—C(=S)—NR"R'" group or a —NR'—C(=S)—NR"— group, with R', R" and R'" as defined herein.

The term "amide" as used herein encompasses C-amide and N-amide.

The term "C-amide" describes a —C(=O)—NR'R" group or a —C(=O)—NR'— group, where R' and R" are as defined herein.

The term "N-amide" describes a R'C(=O)—NR"— group or a R'C(=O)—N— group, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— group or a —R'NC(=N)— group, where R' and R" are as defined herein.

The term "guanidine" describes a —R'NC(=N)—NR"R'" group or a —R'NC(=N)—NR"— group, where R', R" and R'" are as defined herein.

The term "hydrazine" describes a —NR'—NR"R'" group or a —NR'—NR"— group, with R', R", and R'" as defined herein.

As used herein, the term "hydrazide" describes a —C(=O)—NR'—NR"R'" group or a —C(=O)—NR'—NR"— group, where R', R" and R'" are as defined herein.

As used herein, the term "thiohydrazide" describes a —C(=S)—NR'—NR"R'" group or a —C(=S)—NR'—NR"— group, where R', R" and R'" are as defined herein.

As used herein, the term "alkylene glycol" describes a —O—[(CR'R")x-O]y-R'" end group or a —O—[(CR'R")$_z$—O]$_y$— linking group, with R', R" and R'" being as defined herein, and with z being an integer of from 1 to 10, preferably, 2-6, more preferably 2 or 3, and y being an integer of 1 or more. Preferably R' and R" are both hydrogen. When z is 2 and y is 1, this group is ethylene glycol. When z is 3 and y is 1, this group is propylene glycol.

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Table 1 below presents exemplary components which are usable for inclusion in a support material formulation according to some embodiments of the present invention

TABLE 1

| # | Component | Trade name |
|---|---|---|
| A | ACMO | ACMO |
| B | Hydroxybutyl vinyl ether | HBVE |
| C | Alkoxylated polyol | Polyol 3165 |
| D | Polypropylene glycol 2 kDa | Pluriol 2000 |

TABLE 1-continued

| # | Component | Trade name |
|---|---|---|
| E | Polypropylene glycol 0.9 kDa | Pluriol 900 |
| F | Propane diol | Propane diol |
| G | Silicone polyether | Silsurf C410 |
| H | Anionic/cationic complex silicone polyether | Silplex CS-1 Coco |
| I | Polyglycerol | R-PG3 |
| J | Photoinitiator | Irgacure ® 184 |
| K | Inhibitor | NPAL |
| L | surface active agent | BYK 345 |
| M | Water | |

Table 2 below describes exemplary support material formulations made of various combinations of the materials presented in Table 1.

TABLE 2

| Component | Formulation 1 | Formulation 2 | Formulation 3 | Formulation 4 |
|---|---|---|---|---|
| A | X | X | X | X |
| B | | | | X |
| C | | | | X |
| D | X | X | X | |
| E | X | | X | |
| F | | X | | |
| G | X | | | |
| H | | | X | |
| I | | X | | |
| J | X | X | X | X |
| K | X | X | X | X |
| L | X | X | X | X |
| M | X | X | X | X |

Example 2

Different formulations containing a curable monomer, a water miscible polymer and a water soluble or water miscible silicone polyether were compared to a similar formulation containing Polyol 3165 instead of the silicon polyether, in terms of viscosity and dissolution rate in water.

Viscosity of each of the tested formulations was determined before curing, at 75° C. A "suitable viscosity" ranges from 15-25 centipoise.

Dissolution rate was measured by placing 30 grams of the tested formulation in molds in UV oven. The cured material in the mold was inserted into a beaker with 500 ml of water under continuous stirring. The time required to obtain complete dissolution of the material was measured, and the dissolution rate was followed and measured.

The silicon polyethers marketed as AL-Sisurf C-410 and AL-Sisense SW-12 (see, structures below), were found to exhibit the highest dissolution rate and a viscosity similar to that of the Polyol 3165-containing formulation.

Other silicon polyether-containing formulations also exhibited similar or slightly higher viscosity and/or higher dissolution rate, compared to the Polyol 3165-containing formulation. Generally, suitable viscosity and improved dissolution rate were observed for silicone polyethers which do not feature ionizable groups, as described herein.

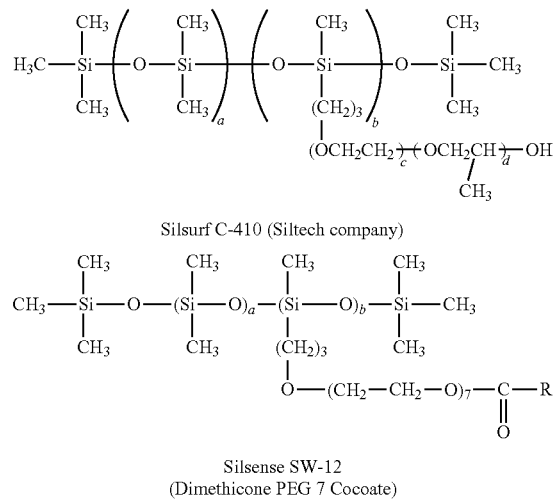

Silsurf C-410 (Siltech company)

Silsense SW-12
(Dimethicone PEG 7 Cocoate)

Example 3

Dissolution rate of printed articles made of a support material formulation according to some embodiments of the present invention is measured by printing the article, using solely the tested support formulation, by a 3D inkjet printing system, placing the obtained printed article in a vessel containing tap water under continuous magnetic stirring and monitoring the time required to complete dissolution of the printed article. For comparison, commercially available support material formulation is used to form the same printed article, and its dissolution time under the same conditions is measured.

In an exemplary assay, 20×20×20 mm cubes are printed while using an exemplary support material formulation according to some embodiments of the present invention or a commercially available formulation, and the printed cubes are subjected to curing by UV radiation. Each of the cured cubes is inserted into a beaker with 500 ml or 1 Liter of water under continuous stirring and the time to complete dissolution is monitored.

The time to complete dissolution of a cube made of a commercially available support material the time was 160 minutes, whereby the time to complete dissolution of a cube made using an exemplary support material formulation according to some embodiments of the present invention is lower.

Example 4

Objects were printed using a 3D inkjet printing system so as to have model walls surrounded by a support material.

Table 3 below presents dissolution times measured for objects of variable shapes, made using a modeling material formulation and an exemplary support material formulation according to some embodiments of the present invention (Soluble support II), upon curing, compared to objects made of the same modeling formulation and a commercially available support material formulation (Soluble Support I), upon curing.

TABLE 3

| Model | Dissolution time Soluble Support II | Dissolution time Soluble Support I | Model weight | Support weight | Dimensions |
|---|---|---|---|---|---|
| Ball | 1 h 12 min | 2 h 30 min | 69 grams | 29 grams | 40 mm |
| Pyramid | 41 min | 2 h 30 min | 189 grams | 192 grams | 60 × 60 × 60 mm |
| Thin walls | 45 min | 1 h 45 min | 69 grams | 60 grams | 120 × 60 × 30 mm |
| Buddha | 1 h 39 min | 3 h 45 min | 147 grams | 61 grams | 51 × 80 × 45 mm |
| Cow | 1 h 45 min | 3 h 15 min | 80 grams | 45 grams | 93 × 44 × 30 mm |
| Mouse | 3 h | 3 h 45 min | 60 grams | 92 grams | 65 × 116 × 25 mm |

As shown, a cured support material according to the present embodiments exhibits dissolution times lower by 50% or more compared to a cured support material obtained using a representative commercially available support material formulation.

The cured support material according to embodiments of the invention exhibits significantly increased water solubility, as reflected by the substantially lower dissolution times.

Additional measurements, of mechanical and physical properties of the objects upon removal of the support material, were performed and the obtained data is presented in Table 4. The data is presented so as to reflect the change of each property upon using the support formulation of the present embodiments (Soluble Support II) compared to Soluble Support I formulation (for which the values are presented as "X").

TABLE 4

| | Soluble Support I | Soluble Support II |
|---|---|---|
| Tensile Strength (MPa) | X | 3X |
| Elongation at break (%) | X | 4X |
| Flexural Modulus (MPa) | X | 0.6X |
| Flexural strength (MPa) | X | 3.7X |
| HDT (° C.) | X | X |
| Impact (printed notch) (J/m) | X | 1.3X |

In additional assays, objects were printed using a 3D inkjet printing system so as to have model walls surrounded by a support material. The support material was thereafter removed, and the object dried. The wall thickness was then measured with a micrometer device.

For objects with identical walls, an exemplary support material according to some embodiments of the present invention or a commercially available support material formulation was used.

The cured support material made of an exemplary formulation according to some embodiments of the present invention was removed using water, while a cured support material made of a commercially available support material formulation required at least a following treatment in a caustic solution (e.g. 1% NaOH) to receive similar results.

After removal of the support material measurements are made for determining the presence and properties of a mixed layer, as defined herein.

In some embodiments, measurements are made by determining a thickness of a mixed layer, and estimating the volume percent of the mixed layer relative to the printed object's volume. In an exemplary assay, an object having a cube shape is printed using a modeling material and support material formulations, and the volume percent of the mixed layer is determined according to the following equation:

% mixing layer=(mixing layer thickness)×(surface area of cube)/volume of cube

A 1 $cm^3$ cube printed using a commercially available formulation typically comprises at least 6%, and even 10% of a mixed layer. The same cube printed with a support material formulation according to embodiments of the present invention comprises a mixed layer at a volume percent of less than 10%, or less than 6%, or less than 5%, or less than 4%, or even less.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A support material formulation comprising:
   a curable, water-soluble mono-functional monomeric material of the formula:

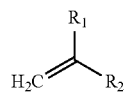

wherein:
   $R_1$ is —C(═O)—OR' and R' is a hydrophilic group selected from a heteroalicyclic group having a ratio of 5:1 or lower of carbon atoms to electron-donating heteroatoms, C(1-4)alkyl optionally substituted or interrupted by one or more of hydroxy, —O—, amine or —NH—, hydroxy, thiol, and alkylene glycol, or
   $R_1$ is —C(═O)—NR'R", and R' and R" are each independently selected from hydrogen, alkyl, cycloalkyl, aryl, hydroxyalkyl, trihaloalkyl, a heteroaryl, and a heteroalicyclic, provided that at least one of R' and R" is a hydrophilic group selected from a heteroalicyclic group having a ratio of 5:1 or lower of carbon atoms to electron-donating heteroatoms, C(1-4)alkyl optionally substituted or interrupted by one or more of hydroxy, —O—, amine or —NH—, and alkylene glycol; and $R_2$ is selected from hydrogen, C(1-4) alkyl, and C(1-4) alkoxy, a non-curable water-miscible polymeric material selected from an alkoxylated polyol, polypropylene glycol, and polyglycerol, and a silicone polyether having a polydimethyl siloxane backbone and two or more polyether terminal and/or pendant groups, wherein:

a concentration of said mono-functional monomeric material ranges from 20 to 40 weight percent of the total weight of the formulation, a concentration of said water-miscible polymeric material ranges from 40 to 70 weight percent of the total weight of the formulation, and a concentration of said silicone polyether ranges from 5 to 20 weight percent of the total weight of the formulation.

2. The formulation of claim 1, wherein $R_1$ is —C(=O)—OR'.

3. The formulation of claim 2, wherein R' is said heteroalicyclic group.

4. The formulation of claim 1, wherein said a curable, water-soluble mono-functional monomeric material is selected from acryloyl morpholino, [2-(acryloyloxy)ethyl] trimethylammonium chloride, N-(3,3-dimethylaminopropyl) methacrylamide, and methacrylamide (2-methyl-propenamide).

5. The formulation of claim 1, wherein said water-miscible polymeric material comprises a polypropylene glycol.

6. The formulation of claim 4, wherein said water-miscible polymeric material comprises a polypropylene glycol.

7. The formulation of claim 1, wherein said silicone polyether is represented by Formula I:

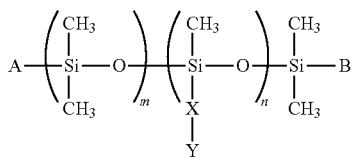

Formula I wherein:

n and m each independently an integer, wherein n+m is an integer of from 1 to 500, representing the number of backbone units, minus 1;

X is an alkylene or absent;

Y is said polyether moiety or absent; and

A and B are each independently an alkyl or said polyether moiety, provided that either Y or each of A and B is said polyether moiety, wherein when X is said alkylene, Y is said polyether moiety.

8. The formulation of claim 7, wherein said polyether moiety is represented by Formula II:

Formula II wherein:

y is an integer of from 4 to 100;

x is an integer of from 2 to 6;

R' and R" are each independently hydrogen, alkyl, cycloalkyl, halo, and the like; and Z is a non-ionizable moiety.

9. The formulation of claim 8, wherein Z is selected from hydrogen, alkyl, and a C(8-16)acyl.

10. The formulation of claim 1, further comprising an initiator.

11. The formulation of claim 1, further comprising a surface active agent and/or an inhibitor.

12. A method of fabricating a three-dimensional object, the method comprising dispensing a building material so as to sequentially form a plurality of layers in a configured pattern corresponding to the shape of the object, wherein said building material comprises a modeling material formulation and a support material formulation, and wherein said support material formulation comprises the formulation of claim 1.

13. The method of claim 12, further comprising, subsequent to said dispensing, exposing the building material to curing energy, to thereby obtain a cured modeling material and a cured support material.

14. The method of claim 13, further comprising removing said cured support material, to thereby obtain the three-dimensional object.

15. The method of claim 14, wherein said removing comprises contacting said cured support material with water.

16. The method of claim 14, wherein said removing consists of contacting said cured support material with water.

17. A three-dimensional object fabricated by the method of claim 12.

* * * * *